US00RE45748E

(19) United States
(12) Reissued Patent
Zhang et al.

(10) Patent Number: US RE45,748 E
(45) Date of Reissued Patent: Oct. 13, 2015

(54) MODIFIED CUTTERS AND A METHOD OF DRILLING WITH MODIFIED CUTTERS

(71) Applicants: Youhe Zhang, Spring, TX (US); Yuelin Shen, Spring, TX (US)

(72) Inventors: Youhe Zhang, Spring, TX (US); Yuelin Shen, Spring, TX (US)

(73) Assignee: Smith International, Inc., Houston, TX (US)

(21) Appl. No.: 14/180,121

(22) Filed: Feb. 13, 2014

Related U.S. Patent Documents

Reissue of:
(64) Patent No.: 8,113,303
Issued: Feb. 14, 2012
Appl. No.: 12/796,560
Filed: Jun. 8, 2010

U.S. Applications:
(63) Continuation of application No. 11/855,770, filed on Sep. 14, 2007, now Pat. No. 7,757,785, which is a continuation of application No. 11/117,647, filed on Apr. 28, 2005, now abandoned.

(60) Provisional application No. 60/648,863, filed on Feb. 1, 2005, provisional application No. 60/584,307, filed on Jun. 30, 2004, provisional application No. 60/566,751, filed on Apr. 30, 2004.

(51) Int. Cl.
*E21B 10/55* (2006.01)
*E21B 10/567* (2006.01)
*E21B 10/573* (2006.01)

(52) U.S. Cl.
CPC ..... *E21B 10/5673* (2013.01); *E21B 10/5735* (2013.01)

(58) Field of Classification Search
CPC ..... E21B 10/5735; E21B 10/5673
USPC ..... 175/430, 431, 432, 434
See application file for complete search history.

(56) References Cited

U.S. PATENT DOCUMENTS

| | | | | |
|---|---|---|---|---|
| 3,745,623 | A | 7/1973 | Wentorf, Jr. et al. | |
| 4,104,344 | A | 8/1978 | Pope et al. | |
| 4,288,248 | A | 9/1981 | Bovenkerk et al. | |
| 4,529,048 | A | 7/1985 | Hall | 175/432 |
| 4,558,753 | A | 12/1985 | Barr | |

(Continued)

FOREIGN PATENT DOCUMENTS

| | | | |
|---|---|---|---|
| EP | 0918135 | A1 | 5/1999 |
| GB | 2380211 | A | 4/2003 |

(Continued)

OTHER PUBLICATIONS

Combined Search and Examination Report for British Appl. No. GB0508877.8; dated Jun. 8, 2005; 6 pages.

(Continued)

*Primary Examiner* — William Doerrler
(74) *Attorney, Agent, or Firm* — Osha Liang LLP

(57) ABSTRACT

A cutter for a fixed cutter drill bit including a substrate and an ultrahard material layer disposed on an end surface of the substrate, the ultra hard material layer having an upper surface opposite the substrate end surface and a peripheral surface such that the upper surface intersects the peripheral surface along a peripheral edge. The peripheral edge continuously increases and decreases in height as measured from a plane perpendicular to a longitudinal axis of the cutter.

39 Claims, 7 Drawing Sheets

(56) References Cited

U.S. PATENT DOCUMENTS

| | | | | |
|---|---|---|---|---|
| 4,570,726 | A | 2/1986 | Hall | |
| 4,593,777 | A | 6/1986 | Barr | |
| 4,858,707 | A | 8/1989 | Jones et al. | |
| 4,872,520 | A | 10/1989 | Nelson | |
| 4,984,642 | A | 1/1991 | Renard et al. | |
| 5,025,874 | A | 6/1991 | Barr et al. | |
| 5,314,033 | A | 5/1994 | Tibbitts | |
| 5,332,051 | A | 7/1994 | Knowlton | |
| 5,377,773 | A | 1/1995 | Tibbitts | |
| 5,379,853 | A | 1/1995 | Lockwood et al. | |
| 5,437,343 | A | 8/1995 | Cooley et al. | |
| 5,460,233 | A | 10/1995 | Meany et al. | |
| 5,467,836 | A | 11/1995 | Grimes et al. | |
| 5,592,995 | A | 1/1997 | Scott et al. | |
| 5,649,604 | A | 7/1997 | Fuller et al. | |
| 5,662,183 | A | 9/1997 | Fang | |
| 5,706,906 | A | 1/1998 | Jurewicz et al. | |
| 5,813,485 | A * | 9/1998 | Portwood | 175/430 |
| 5,871,060 | A | 2/1999 | Jensen et al. | |
| 5,881,830 | A | 3/1999 | Cooley | |
| 5,992,549 | A | 11/1999 | Fuller | |
| 6,003,623 | A | 12/1999 | Miess | |
| 6,045,440 | A | 4/2000 | Johnson et al. | |
| 6,065,554 | A | 5/2000 | Taylor et al. | |
| 6,135,219 | A | 10/2000 | Scott | |
| 6,145,607 | A | 11/2000 | Griffin et al. | |
| 6,202,770 | B1 | 3/2001 | Jurewicz et al. | |
| 6,241,035 | B1 | 6/2001 | Portwood | |
| 6,332,503 | B1 | 12/2001 | Pessier et al. | |
| 6,367,568 | B2 | 4/2002 | Steinke et al. | |
| 6,510,910 | B2 | 1/2003 | Eyre et al. | |
| 6,550,556 | B2 | 4/2003 | Middlemiss et al. | |
| 6,604,588 | B2 | 8/2003 | Eyre et al. | |
| 6,672,406 | B2 | 1/2004 | Beuershausen | |
| 6,904,983 | B2 | 6/2005 | Thigpen et al. | |
| 6,904,984 | B1 | 6/2005 | Estes et al. | |
| 7,140,448 | B2 | 11/2006 | Estes et al. | |
| 7,234,550 | B2 | 6/2007 | Azar et al. | |
| 7,363,992 | B2 | 4/2008 | Stowe et al. | |
| 7,690,971 | B2 | 4/2010 | Sung | |
| 7,757,785 | B2 | 7/2010 | Zhang et al. | |
| 8,087,478 | B2 | 1/2012 | Patel | |
| 2005/0269139 | A1 | 12/2005 | Shen et al. | |
| 2007/0278017 | A1 | 12/2007 | Shen et al. | |
| 2008/0053710 | A1 | 3/2008 | Moss | |
| 2008/0264696 | A1 | 10/2008 | Dourfaye et al. | |
| 2010/0059287 | A1 | 3/2010 | Durairajan et al. | |
| 2010/0059289 | A1 | 3/2010 | Hall et al. | |
| 2012/0247834 | A1 | 10/2012 | Buxbaum et al. | |

FOREIGN PATENT DOCUMENTS

| | | | |
|---|---|---|---|
| GB | 2403697 | A | 1/2005 |
| WO | 2004/072435 | A1 | 8/2004 |

OTHER PUBLICATIONS

Official Action issued in corresponding Canadian Patent Appl. No. 2,505,828; Dated May 11, 2006; 3 pages.

Search Report issued Aug. 12, 2013, by Global Patent Solutions (9 pages).

* cited by examiner

FIG. 10A (New)
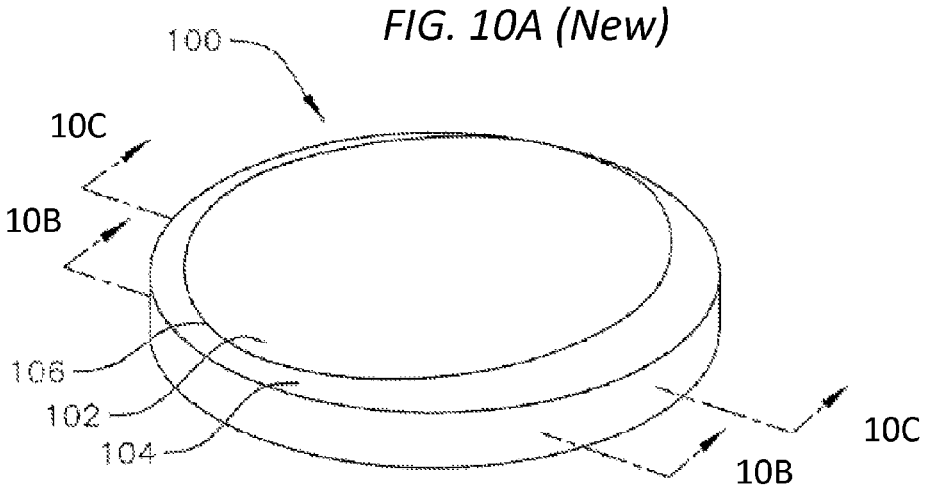
FIG. 10B (New)
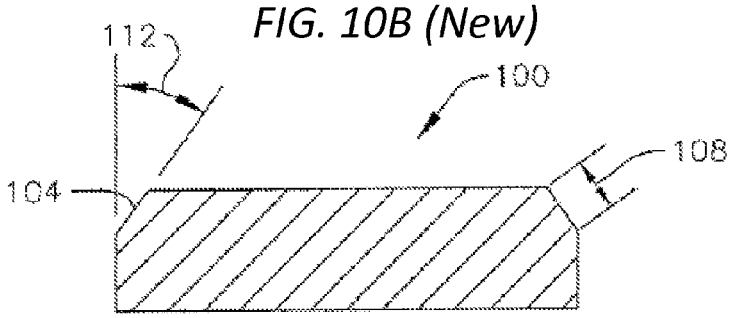
FIG. 10C (New)
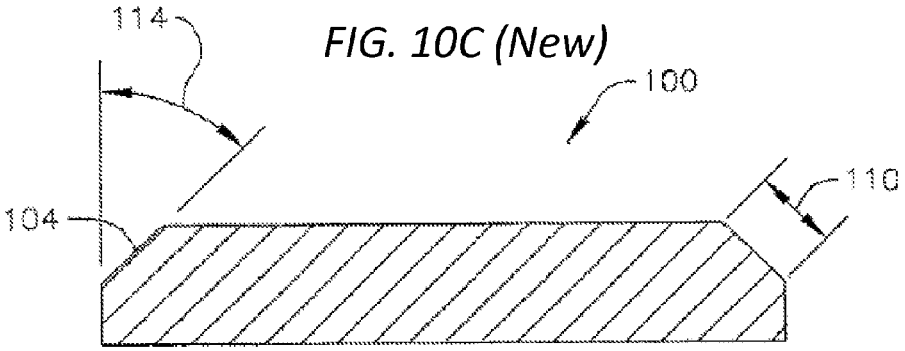

*FIG. 11 (New)*
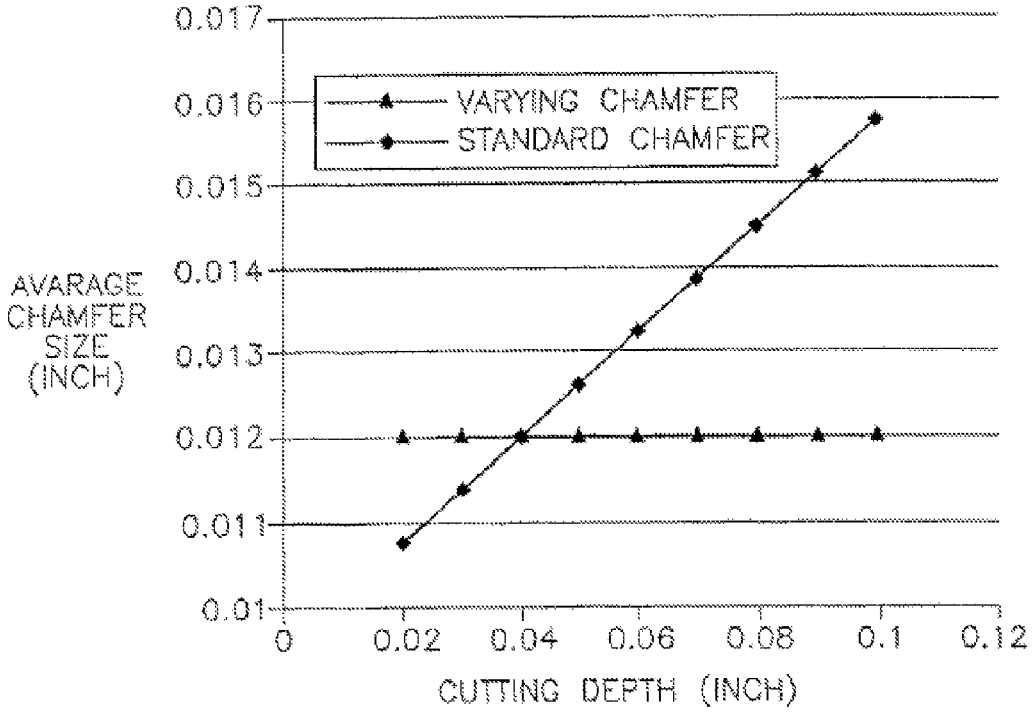

MODIFIED CUTTERS AND A METHOD OF DRILLING WITH MODIFIED CUTTERS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a continuation of U.S. application Ser. No. 11/855,770, filed Sep. 14, 2007 issued as U.S. Pat. No. 7,757,785 on Jul. 20, 2010, which is a continuation of U.S. patent application Ser. No. 11/117,647, filed Apr. 28, 2005, now abandoned, which claims priority, pursuant to 35 U.S.C. §119(e), to U.S. Provisional Patent Application No. 60/648,863, filed Feb. 1, 2005, U.S. Provisional Patent Application No. 60/584,307 filed Jun. 30, 2004, and U.S. Provisional Patent Application No. 60/566,751 filed Apr. 30, 2004. These applications are incorporated herein by reference in their entireties.

BACKGROUND OF INVENTION

1. Field of the Invention

The invention relates generally to modified cutters.

2. Background Art

Rotary drill bits with no moving elements on them are typically referred to as "drag" bits. Drag bits are often used to drill a variety of rock formations. Drag bits include those having cutters (sometimes referred to as cutter elements, cutting elements or inserts) attached to the bit body. For example, the cutters may be formed having a substrate or support stud made of cemented carbide, for example tungsten carbide, and an ultra hard cutting surface layer or "table" made of a polycrystalline diamond material or a polycrystalline boron nitride material deposited onto or otherwise bonded to the substrate at an interface surface.

An example of a prior art drag bit having a plurality of cutters with ultra hard working surfaces is shown in FIG. 1. The drill bit 10 includes a bit body 12 and a plurality of blades 14 that are formed on the bit body 12. The blades 14 are separated by channels or gaps 16 that enable drilling fluid to flow between and both clean and cool the blades 14 and cutters 18. Cutters 18 are held in the blades 14 at predetermined angular orientations and radial locations to present working surfaces 20 with a desired back rake angle against a formation to be drilled. Typically, the working surfaces 20 are generally perpendicular to the axis 19 and side surface 21 of a cylindrical cutter 18. Thus, the working surface 20 and the side surface 21 meet or intersect to form a circumferential cutting edge 22.

Nozzles 23 are typically formed in the drill bit body 12 and positioned in the gaps 16 so that fluid can be pumped to discharge drilling fluid in selected directions and at selected rates of flow between the cutting blades 14 for lubricating and cooling the drill bit 10, the blades 14 and the cutters 18. The drilling fluid also cleans and removes the cuttings as the drill bit rotates and penetrates the geological formation. The gaps 16, which may be referred to as "fluid courses," are positioned to provide additional flow channels for drilling fluid and to provide a passage for formation cuttings to travel past the drill bit 10 toward the surface of a wellbore (not shown).

The drill bit 10 includes a shank 24 and a crown 26. Shank 24 is typically formed of steel or a matrix material and includes a threaded pin 28 for attachment to a drill string. Crown 26 has a cutting face 30 and outer side surface 32. The particular materials used to form drill bit bodies are selected to provide adequate toughness, while providing good resistance to abrasive and erosive wear. For example, in the case where an ultra hard cutter is to be used, the bit body 12 may be made from powdered tungsten carbide (WC) infiltrated with a binder alloy within a suitable mold form. In one manufacturing process the crown 26 includes a plurality of holes or pockets 34 that are sized and shaped to receive a corresponding plurality of cutters 18.

The combined plurality of surfaces 20 of the cutters 18 effectively forms the cutting face of the drill bit 10. Once the crown 26 is formed, the cutters 18 are positioned in the pockets 34 and affixed by any suitable method, such as brazing, adhesive, mechanical means such as interference fit, or the like. The design depicted provides the pockets 34 inclined with respect to the surface of the crown 26. The pockets 34 are inclined such that cutters 18 are oriented with the working face 20 at a desired rake angle in the direction of rotation of the bit 10, so as to enhance cutting. It will be understood that in an alternative construction (not shown), the cutters can each be substantially perpendicular to the surface of the crown, while an ultra hard surface is affixed to a substrate at an angle on a cutter body or a stud so that a desired rake angle is achieved at the working surface.

A typical cutter 18 is shown in FIG. 2. The typical cutter 18 has a cylindrical cemented carbide substrate body 38 having an end face or upper surface 54 referred to herein as the "interface surface" 54. An ultra hard material layer (cutting layer) 44, such as polycrystalline diamond or polycrystalline cubic boron nitride layer, forms the working surface 20 and the cutting edge 22. A bottom surface 52 of the cutting layer 44 is bonded on to the upper surface 54 of the substrate 38. The joining surfaces 52 and 54 are herein referred to as the interface 46. The top exposed surface or working surface 20 of the cutting layer 44 is opposite the bottom surface 52. The cutting layer 44 typically has a flat or planar working surface 20, but may also have a curved exposed surface, that meets the side surface 21 at a cutting edge 22.

Cutters may be made, for example, according to the teachings of U.S. Pat. No. 3,745,623, whereby a relatively small volume of ultra hard particles such as diamond or cubic boron nitride is sintered as a thin layer onto a cemented tungsten carbide substrate. Flat top surface cutters as shown in FIG. 2 are generally the most common and convenient to manufacture with an ultra hard layer according to known techniques. It has been found that cutter chipping, spalling and delamination are common failure modes for ultra hard flat top surface cutters.

Generally speaking, the process for making a cutter 18 employs a body of cemented tungsten carbide as the substrate 38, wherein the tungsten carbide particles are cemented together with cobalt. The carbide body is placed adjacent to a layer of ultra hard material particles such as diamond or cubic boron nitride particles and the combination is subjected to high temperature at a pressure where the ultra hard material particles are thermodynamically stable. This results in recrystallization and formation of a polycrystalline ultra hard material layer, such as a polycrystalline diamond or polycrystalline cubic boron nitride layer, directly onto the upper surface 54 of the cemented tungsten carbide substrate 38.

It has been found by applicants that many cutters develop cracking, spalling, chipping and partial fracturing of the ultra hard material cutting layer at a region of cutting layer subjected to the highest loading during drilling. This region is referred to herein as the "critical region" 56. The critical region 56 encompasses the portion of the cutting layer 44 that makes contact with the earth formations during drilling. The critical region 56 is subjected to the generation of high magnitude stresses from dynamic normal loading, and shear loadings imposed on the ultra hard material layer 44 during drilling. Because the cutters are typically inserted into a drag bit at a rake angle, the critical region includes a portion of the ultra hard material layer near and including a portion of the layer's circumferential edge 22 that makes contact with the earth formations during drilling.

The high magnitude stresses at the critical region 56 alone or in combination with other factors, such as residual thermal stresses, can result in the initiation and growth of cracks 58 across the ultra hard layer 44 of the cutter 18. Cracks of sufficient length may cause the separation of a sufficiently large piece of ultra hard material, rendering the cutter 18 ineffective or resulting in the failure of the cutter 18. When this happens, drilling operations may have to be ceased to allow for recovery of the drag bit and replacement of the ineffective or failed cutter. The high stresses, particularly shear stresses, can also result in delamination of the ultra hard layer 44 at the interface 46.

One type of ultra hard working surface 20 for fixed cutter drill bits is formed as described above with polycrystalline diamond on the substrate of tungsten carbide, typically known as a polycrystalline diamond compact (PDC), PDC cutters, PDC cutting elements, or PDC inserts. Drill bits made using such PDC cutters 18 are known generally as PDC bits. While the cutter or cutter insert 18 is typically formed using a cylindrical tungsten carbide "blank" or substrate 38 which is sufficiently long to act as a mounting stud 40, the substrate 38 may also be an intermediate layer bonded at another interface to another metallic mounting stud 40.

The ultra hard working surface 20 is formed of the polycrystalline diamond material, in the form of a cutting layer 44 (sometimes referred to as a "table") bonded to the substrate 38 at an interface 46. The top of the ultra hard layer 44 provides a working surface 20 and the bottom of the ultra hard layer cutting layer 44 is affixed to the tungsten carbide substrate 38 at the interface 46. The substrate 38 or stud 40 is brazed or otherwise bonded in a selected position on the crown of the drill bit body 12 (FIG. 1). As discussed above with reference to FIG. 1, the PDC cutters 18 are typically held and brazed into pockets 34 formed in the drill bit body at predetermined positions for the purpose of receiving the cutters 18 and presenting them to the geological formation at a rake angle.

In order for the body of a drill bit to be resistant to wear, hard and wear-resistant materials such as tungsten carbide are typically used to form the drill bit body for holding the PDC cutters. Such a drill bit body is very hard and difficult to machine. Therefore, the selected positions at which the PDC cutters 18 are to be affixed to the bit body 12 are typically formed during the bit body molding process to closely approximate the desired final shape. A common practice in molding the drill bit body is to include in the mold, at each of the to-be-formed PDC cutter mounting positions, a shaping element called a "displacement."

A displacement is generally a small cylinder, made from graphite or other heat resistant materials, which is affixed to the inside of the mold at each of the places where a PDC cutter is to be located on the finished drill bit. The displacement forms the shape of the cutter mounting positions during the bit body molding process. See, for example, U.S. Pat. No. 5,662,183 issued to Fang for a description of the infiltration molding process using displacements.

It has been found by applicants that cutters with sharp cutting edges or small back rake angles provide a good drilling ROP, but are often subject to instability and are susceptible to chipping, cracking or partial fracturing when subjected to high forces normal to the working surface. For example, large forces can be generated when the cutter "digs" or "gouges" deep into the geological formation or when sudden changes in formation hardness produce sudden impact loads. Small back rake angles also have less delamination resistance when subjected to shear load. Cutters with large back rake angles are often subjected to heavy wear, abrasion and shear forces resulting in chipping, spalling, and delamination due to excessive downward force or weight on bit (WOB) required to obtain reasonable ROP. Thick ultra hard layers that might be good for abrasion wear are often susceptible to cracking, spalling, and delamination as a result of residual thermal stresses associated with forming thick ultra hard layers on the substrate. The susceptibility to such deterioration and failure mechanisms is accelerated when combined with excessive load stresses.

FIG. 3 shows a prior art PDC cutter held at an angle in a drill bit 10 for cutting into a formation 45. The cutter 18 includes a diamond material table 44 affixed to a tungsten carbide substrate 38 that is bonded into the pocket 34 formed in a drill bit blade 14. The drill bit 10 (see FIG. 1) will be rotated for cutting the inside surface of a cylindrical well bore. Generally speaking, the back rake angle "A" is used to describe the working angle of the working surface 20, and it also corresponds generally to the magnitude of the attack angle "B" made between the working surface 20 and an imaginary tangent line at the point of contact with the well bore. It will be understood that the "point" of contact is actually an edge or region of contact that corresponds to critical region 56 (see FIG. 2) of maximum stress on the cutter 18. Typically, the geometry of the cutter 18 relative to the well bore is described in terms of the back rake angle "A."

Different types of bits are generally selected based on the nature of the geological formation to be drilled. Drag bits are typically selected for relatively soft formations such as sands, clays and some soft rock formations that are not excessively hard or excessively abrasive. However, selecting the best bit is not always straightforward because many formations have mixed characteristics (i.e., the geological formation may include both hard and soft zones), depending on the location and depth of the well bore. Changes in the geological formation can affect the desired type of a bit, the desired ROP of a bit, the desired rotation speed, and the desired downward force or WOB. Where a drill bit is operated outside the desired ranges of operation, the bit can be damaged or the life of the bit can be severely reduced.

For example, a drill bit normally operated in one general type of formation may penetrate into a different formation too rapidly or too slowly subjecting it to too little load or too much load. For another example, a drill bit rotating and penetrating at a desired speed may encounter an unexpectedly hard formation material, possibly subjecting the bit to a "surprise" or sudden impact force. A formation material that is softer than expected may result in a high rate of rotation, a high ROP, or both, that can cause the cutters to shear too deeply or to gouge into the geological formation.

This can place greater loading, excessive shear forces and added heat on the working surface of the cutters. Rotation speeds that are too high without sufficient WOB, for a particular drill bit design in a given formation, can also result in detrimental instability (bit whirling) and chattering because the drill bit cuts too deeply or intermittently bites into the geological formation. Cutter chipping, spalling, and delamination, in these and other situations, are common failure modes for ultra hard flat top surface cutters.

Dome cutters have provided certain benefits against gouging and the resultant excessive impact loading and instability. This approach for reducing adverse effects of flat surface cutters is described in U.S. Pat. No. 5,332,051. An example of such a dome cutter in operation is depicted in FIG. 4. The prior art cutter 60 has a dome shaped top or working surface 62 that is formed with an ultra hard layer 64 bonded to a substrate 66. The substrate 66 is bonded to a metallic stud 68. The cutter 60 is held in a blade 70 of a drill bit 72 (shown in partial section) and engaged with a geological formation 74 (also shown in partial section) in a cutting operation. The dome shaped working surface 62 effectively modifies the rake angle A that would be produced by the orientation of the cutter 60.

Scoop cutters, as shown at 80 in FIG. 5 (U.S. Pat. No. 6,550,556), have also provided some benefits against the adverse effects of impact loading. This type of prior art cutter 80 is made with a "scoop" or depression 90 formed in the top working surface 82 of an ultra hard layer 84. The ultra hard layer 84 is bonded to a substrate 86 at an interface 88. The depression 90 is formed in the critical region 56. The upper surface 92 of the substrate 86 has a depression 94 corresponding to the depression 90, such that the depression 90 does not make the ultra hard layer 84 too thin. The interface 88 may be referred to as a non-planar interface (NPI).

What is still needed, however, are improved cutters for use in a variety of applications.

SUMMARY OF INVENTION

In one aspect, the present invention relates to a modified cutting element that includes a base portion, an ultrahard layer disposed on said base portion, and at least one modified region disposed adjacent to a cutting face of the cutter.

In one aspect, the present invention relates to a drill bit that includes a bit body; and at least one cutter, the at least one cutter comprising a base portion, an ultrahard layer disposed on said base portion, and at least one modified region disposed adjacent to a cutting face of the cutter.

Other aspects and advantages of the invention will be apparent from the following description and the appended claims.

BRIEF DESCRIPTION OF DRAWINGS

*FIGS. 10A, 10B, and 10C are perspective and cross-sectional views of an ultra hard top layer having a varied geometry chamfer circumferentially around the cutting edge of the working surface of the ultra hard layer wherein the size of the chamfer is varied circumferentially around the cutting edge according to one embodiment;*

*FIG. 11 is a graph showing the average chamfer size as varied with different cutting depths for a cutter having varied chamfer as compared to a cutter having fixed geometry chamfer.*

DETAILED DESCRIPTION

Figure 1:
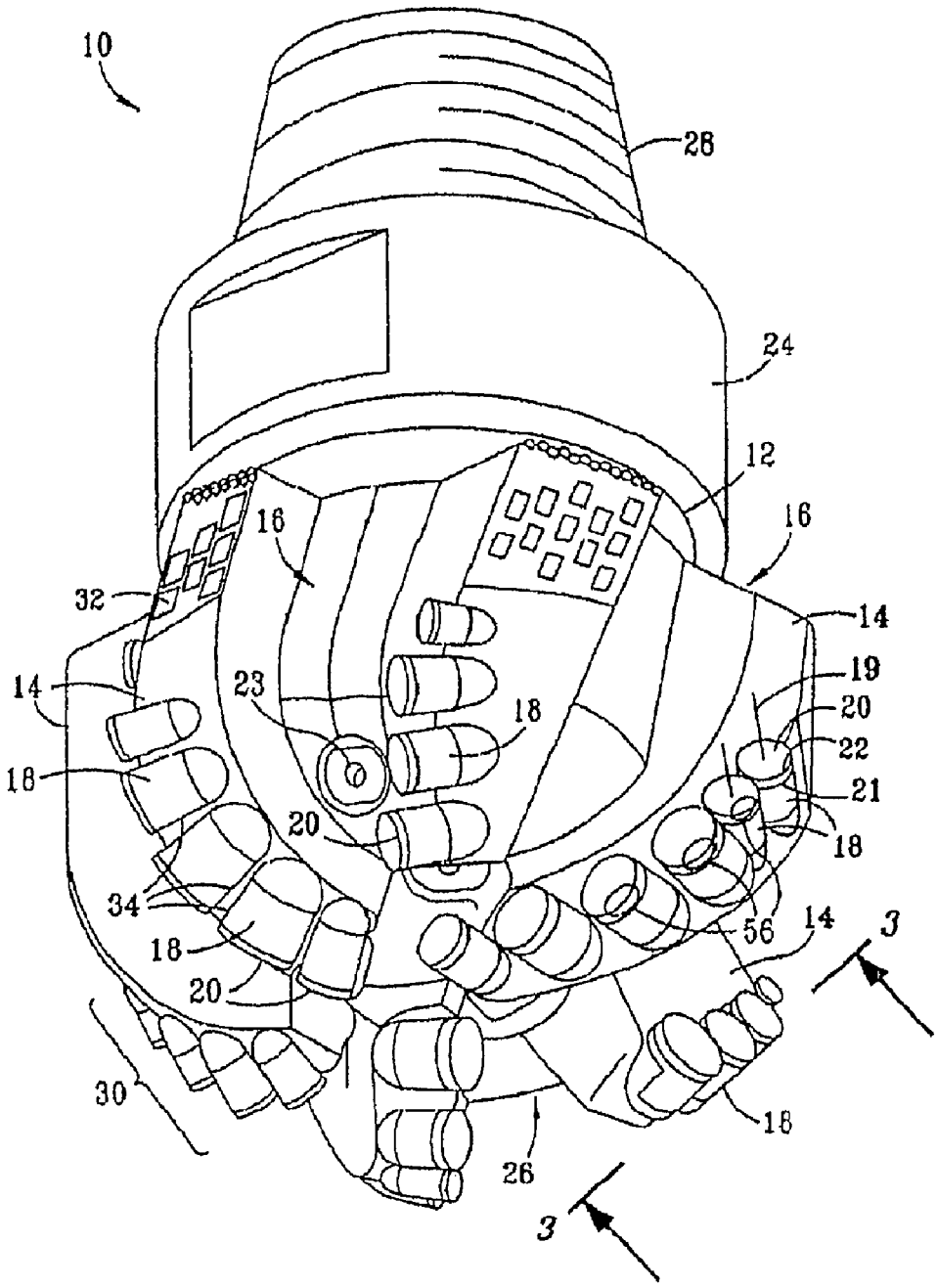
FIG. 1 (PRIOR ART)
FIG. 1 is a perspective view of a prior art fixed cutter drill bit sometimes referred to as a "drag bit"
Figure 2:
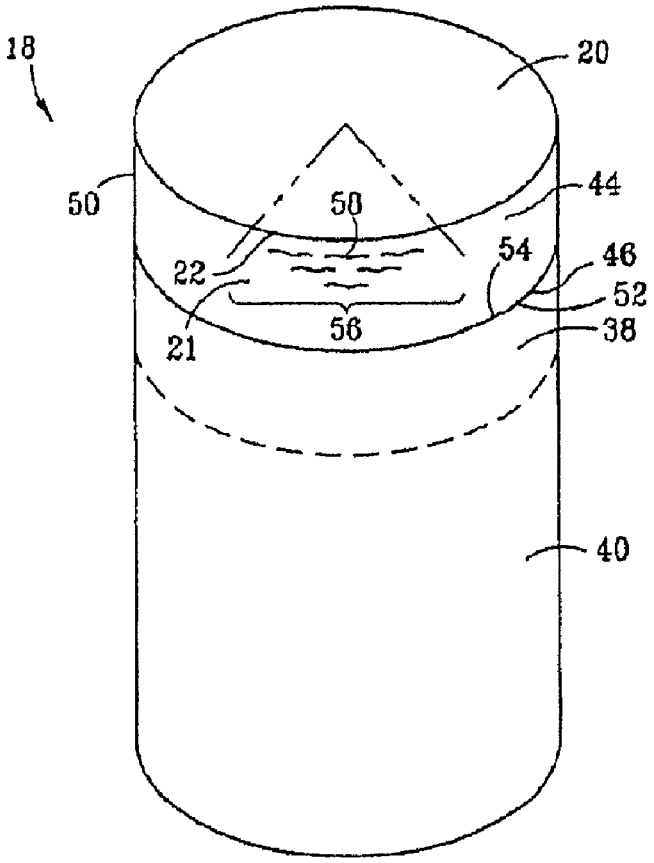
FIG. 2 (PRIOR ART)
FIG. 2 is a perspective view of a prior art cutter or cutter insert with an ultra hard layer bonded to a substrate or stud.
Figure 3:
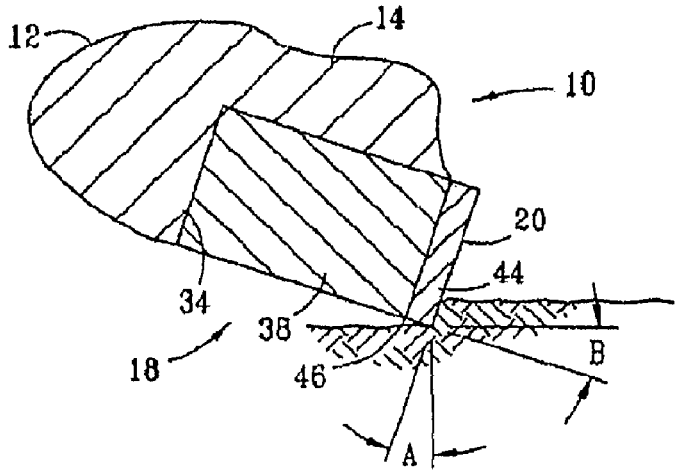
FIG. 3 (PRIOR ART)
FIG. 3 is a partial section view of a prior art flat top cutter held in a blade of a drill bit engaged with a geological formation (shown in partial section) in a cutting operation.
Figure 4:
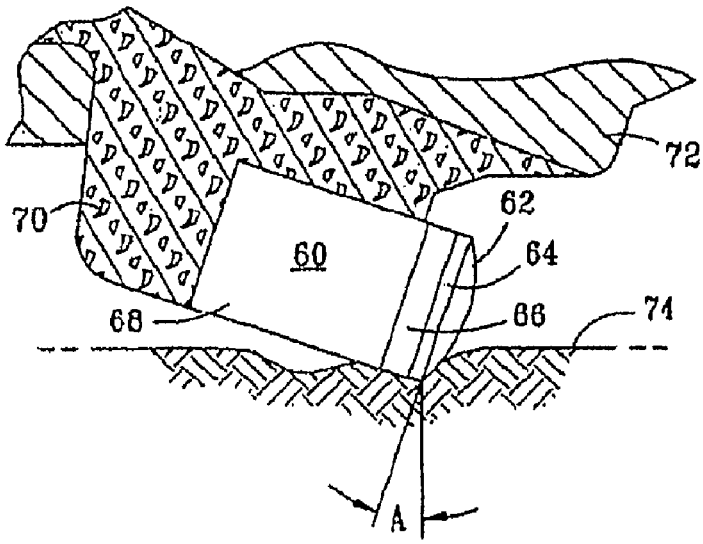
FIG. 4 (PRIOR ART)
FIG. 4 is a schematic view of a prior art dome top cutter with an ultra hard layer bonded to a substrate that is bonded to a stud, where the cutter is held in a blade of a drill bit (shown in partial section) and engaged with a geological formation (also shown in partial section) in a cutting operation.
Figure 5:
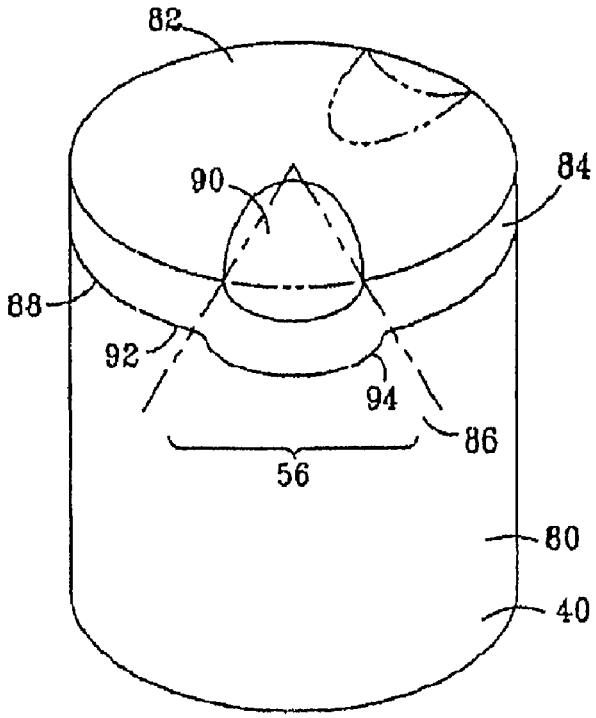
FIG. 5 (PRIOR ART)
FIG. 5 is a perspective view of a prior art scoop top cutter with an ultra hard layer bonded to a substrate at a non-planar interface (NPI)

The present invention relates to shaped cutters that provide advantages when compared to prior art cutters. In particular, embodiments of the present invention relate to cutters that have structural modifications to the cutting surface in order to improve cutter performance. As a result of the modifications, embodiments of the present invention may provide improved cooling, higher cutting efficiency, and longer lasting cutters when compared with prior art cutters.

Embodiments of the present invention relate to cutters having a substrate or support stud, which in some embodiments may be made of cemented carbide, for example tungsten carbide, and an ultra hard cutting surface layer or "table" made of a polycrystalline diamond material or a polycrystalline boron nitride material deposited onto or otherwise bonded to the substrate at an interface surface. Also, in selected embodiments, the ultra-hard layer may comprise a "thermally stable" layer. One type of thermally stable layer that may be used in embodiments of the present invention is leached polycrystalline diamond.

A typical polycrystalline diamond layer includes individual diamond "crystals" that are interconnected. The individual diamond crystals thus form a lattice structure. A metal catalyst, such as cobalt may be used to promote recrystallization of the diamond particles and formation of the lattice structure. Thus, cobalt particles are typically found within the interstitial spaces in the diamond lattice structure. Cobalt has a significantly different coefficient of thermal expansion as compared to diamond. Therefore, upon heating of a diamond table, the cobalt and the diamond lattice will expand at different rates, causing cracks to form in the lattice structure and resulting in deterioration of the diamond table.

In order to obviate this problem, strong acids may be used to "leach" the cobalt from the diamond lattice structure. Examples of "leaching" processes can be found, for example in U.S. Pat. Nos. 4,288,248 and 4,104,344. Briefly, a hot strong acid, e.g., nitric acid, hydrofluoric acid, hydrochloric acid, or perchloric acid, or combinations of several strong acids may be used to treat the diamond table, removing at least a portion of the catalyst from the PDC layer.

Removing the cobalt causes the diamond table to become more heat resistant, but also causes the diamond table to be more brittle. Accordingly, in certain cases, only a select portion (measured either in depth or width) of a diamond table is leached, in order to gain thermal stability without losing impact resistance. As used herein, thermally stable polycrystalline diamond compacts include both of the above (i.e., partially and completely leached) compounds. In one embodiment of the invention, only a portion of the polycrystalline diamond compact layer is leached. For example, a polycrystalline diamond compact layer having a thickness of 0.010 inches may be leached to a depth of 0.006 inches. In other embodiments of the invention, the entire polycrystalline diamond compact layer may be leached. A number of leaching depths may be used, depending on the particular application, for example, in one embodiment the leaching depth may be 0.05 mm.

Figure 6A:
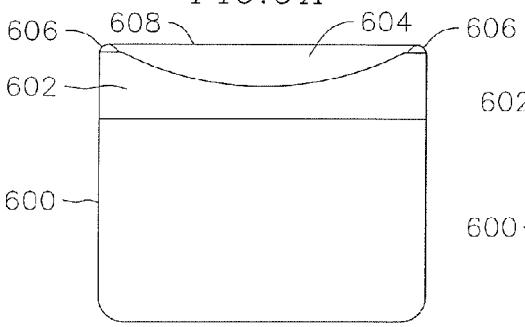
FIGS. 6A, 6B, and 6C show a side, front, and perspective view of a cutter in accordance with an embodiment of the present invention.
Figure 6B:
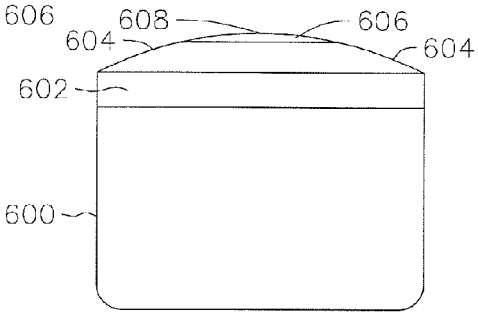
Figure 6C:
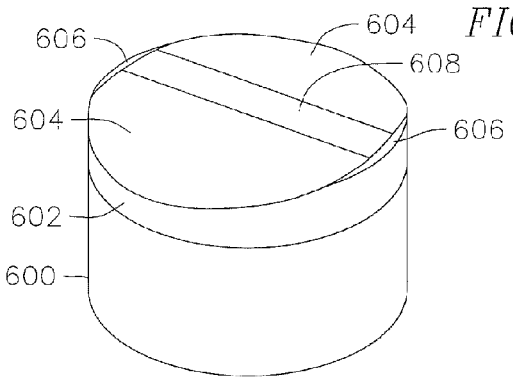

FIGS. 6a-6c show multiple views of a cutter formed in accordance with an embodiment of the present invention. In FIG. 6a, a cutter comprises a substrate or "base portion," 600, on which an ultrahard layer 602 is disposed. In this embodiment, the ultrahard layer 602 comprises a polycrystalline diamond layer. As explained above, when a polycrystalline diamond layer is used, the layer may further be partially or completely leached. A beveled edge 606 may be provided on at least one side of the ultrahard layer 602, but more commonly, may be placed on at least two sides, so that the cutter may be removed and reoriented for use a second time. Further, at least one modified region 604 is formed on the ultrahard layer 602. FIGS. 6b and 6c show that, in this embodiment, two modified regions 604 have been formed on the ultrahard layer 602. In particular, in FIG. 6c the modified regions 604 comprise tapered portions that have been machined from the ultrahard layer 602.

The original height of the diamond table layer is shown as unmodified portion 608, as the modified regions 604 are designed such that the unmodified portion 608 has a discrete width in this embodiment. In some instances the modified region or regions 604 may be formed when the cutter is actually being bonded together (i.e., a modified region is originally built into the ultrahard layer), but in other instances, the modified region may be formed after the formation of the ultrahard layer, by using electrical discharge machining, for example. In addition, in select embodiments, only portions of the modified surface may be leached. Those having ordinary skill in the art will recognize that masking agents may be used to prevent leaching in certain areas, to provide regions that are leached and legions that are unleached.

Wire electrical discharge machining (EDM) is an electrical discharge machining process with a continuously moving conductive wire as tool electrode. The mechanism of metal removal in wire EDM involves the complex erosion effect of electric sparks generated by a pulsating direct current power supply between two closely spaced electrodes in dielectric liquid. The high energy density erodes material from both the wire and workpiece by local melting and vaporizing. Because the new wire keeps feeding to the machining area, the material is removed from the workpiece with the moving of wire electrode. Eventually, a cutting shape is formed on the workpiece by the programmed moving trajectory of wire electrode.

As the term is used herein, a modified region constitutes at least one area, adjacent to the cutting face, that has a lower overall height than the cutting face itself. Cutters containing the modified region 604 have a number of advantages when compared to prior art planar cutters. For example, because the modified region is a depressed area adjacent to the cutting face, improved cooling (due to better fluid flow and/or air flow) around the cutting edge may be seen, which may help prevent failure due to thermal degradation.

In the embodiment shown in FIG. 6c, the beveled edge 606 is formed such that when placed into a pocket, the beveled edge 606 will form the cutting face of the cutter. Those having ordinary skill in the art will appreciate that the size of the beveled edge may be modified depending on the application. For example, in selected applications, the size may range from five thousandths of an inch (0.005 inches) to about fifty thousandths of an inch (0.050 inches). In addition, the bevel may be located at other portions, or additional beveled regions may be provided. In selected embodiments, the modified region 604 is provided such that a self-sharpening effect occurs at the cutting face. That is, as portions of the cutter chip away, a fresh portion is exposed. Having this self-sharpening beveled edge 606 may provide higher cutting efficiency as compared to prior art cutters, as the beveled edge may [initial] *initially* fracture rock more efficiently than a typical planar contact. This feature may be particularly useful in higher hardness formations. *Embodiments may also include cutters having shaped working surfaces with a varied geometry chamfer. Referring now to FIG. 10A, FIG. 10A shows an ultra hard top layer 800 for a cutter that has a shaped working surface 102 including a varied geometry chamfer 104 circumferentially around the cutting edge 106. The bevel 104 is varied in size circumferentially around the cutting edge 106 according to one embodiment. The change in the size or the width of the bevel is demonstrated in the elevation section views of FIGS. 10B and 10C taken along section lines B-B and C-C of FIG. 10A, respectively. In this embodiment, the width 108 in FIG. 10B is smaller than the width 110 in FIG. 10C. The angle 112 of the bevel at section B-B, FIG. 10B, is the same as angle 114 at section line C-C, FIG. 10C; however, in other embodiments, the angle of the bevel is varied circumferentially around the cutting edge. It will be understood that a varied geometry of a bevel could also be provided as a combination of varied size and varied angle. Additionally, in one or more embodiments, the bevel is formed so that its size increases away from the area of the cutter surface engaged with the geological formation. For example, referring to FIG. 11, the amount of the variable size bevel in contact with the formation increases with the depth of cut. Thus, when the cutter digs into the formation, a greater portion of the cutting edge has a larger bevel to give more protection against chipping and spalling.*

Figure 7:
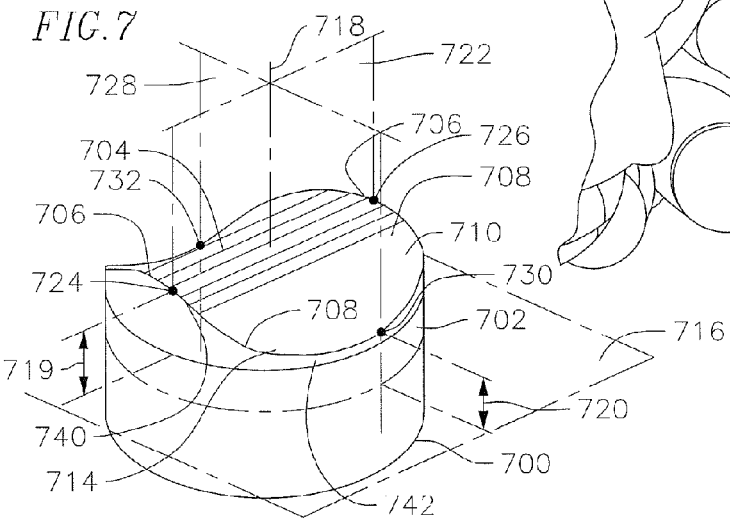
FIG. 7 shows a cutter in accordance with another embodiment of the present invention.

In FIG. 7, another embodiment of the present invention is shown. In FIG. 7, a cutter 700, is shown having a base portion 702 and a ultrahard layer 704 disposed thereon. Further, a beveled edge 706 is provided at a cutting face of the insert. In this embodiment, a modified region 708 extends over substantially all of the cutter 700. In this embodiment, the modified region 708 comprises a substantially continuous "saddle shaped" region. In this embodiment, if the modified region is formed after the deposition of an ultrahard layer, the modified region may be formed in a single manufacturing pass, whereas with the multiple modified regions in FIGS. 6A, 6B, and 6C, multiple manufacturing passes may be required. As can be seen from FIG. 7, the ultrahard material layer has an exposed upper surface 710 and a peripheral surface 712, such that the upper surface intersects the peripheral surface along a peripheral edge 714. As can be seen, the peripheral edge 714 continuously decreases in height and increases in height as measured from a first plane 716 perpendicular to a longitudinal axis 718. The peripheral edge decreases from a maximum height 719 as measured from a plane 716 to a minimum height of 720 as measured from the same plane 716. As second plane 722 along the longitudinal axis 718 intersects the peripheral edge at a first point 724 and a second point 726. A third plane 728 along the longitudinal axis 718 insects the peripheral edge at a third point 730 and a fourth point 732. As can be seen from FIG. 7, the peripheral edge has a first convex portion 740 extending from the first point 724 in a direction towards the third point 730. In addition, a first concave portion 742 extends from the first convex portion 740 to the third point 730. Similarly, a second concave portion extends from the third point in a direction towards the second point 726 and a second convex portion extends from the second concave portion to the second point 726. Moreover, a third convex portion extends from the second point 726 in a direction towards the fourth point 732 and a third concave portion extends from the third convex portion to the fourth point 732. In addition, a fourth concave point extends from the fourth point 732 in a direction towards the first point 724 and a fourth convex portion extends from the fourth concave portion to the first point 724.

After formation of the saddle-shaped cutter, mill tests were performed to determine the performance of the cutters. Test results showed that approximately a 20% increase in performance when compared to prior art cutters was seen when a polycrystalline diamond surface was used. In addition, when thermally stable polycrystalline diamond was used as the ultrahard layer, a performance jump of nearly 70% was seen as compared to unmodified thermally stable polycrystalline diamond cutters. As stated above, without being limited to any particular theory, that the improved performance may be due to a number of factors such as, improved cooling around the cutting face, higher cutting efficiency (due to the non-planar interaction at the cutting face), and the fact that a non-planar interface leads to less flaking of the thermally stable polycrystalline diamond.

Cutters formed in accordance with embodiments of the present invention may be used either alone or in conjunction with standard cutters depending on the desired application. In addition, while reference has been made to specific manufacturing techniques, those of ordinary skill will recognize that any number of techniques may be used.

Figure 8:
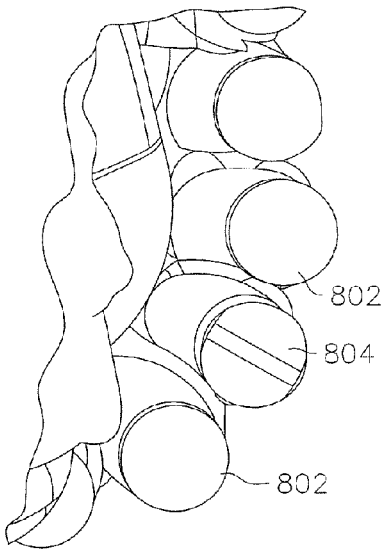
FIG. 8 shows a blade including cutters in accordance with an embodiment of the present invention.
Figure 9:
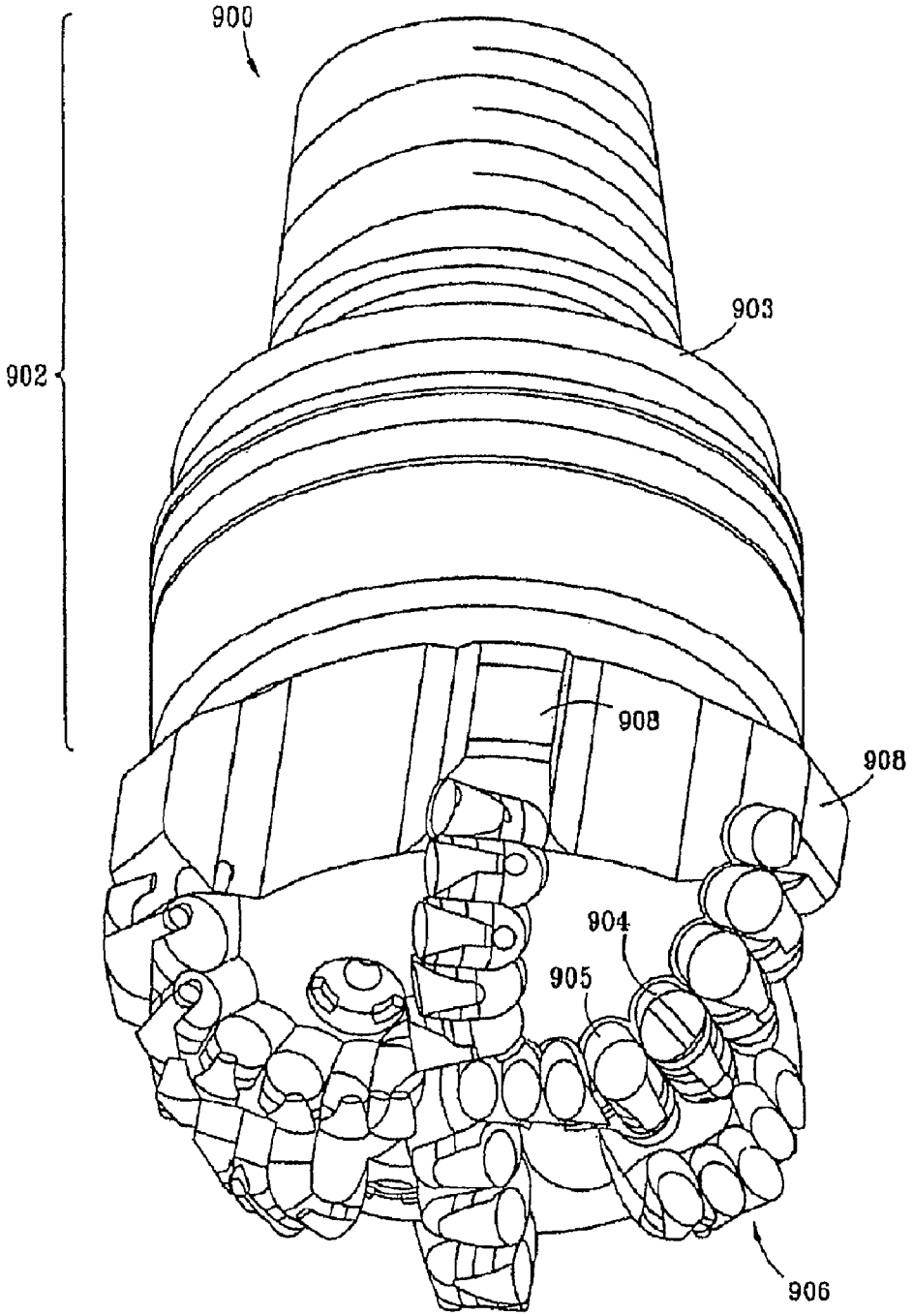
FIG. 9 shows a PDC bit including cutters formed in accordance with an embodiment of the present invention.

FIG. 8 shows a view of cutters formed in accordance with embodiments of the present invention disposed on a blade of a PDC bit. In FIG. 8, modified cutters 804 are intermixed on a blade 800 with standard cutters 802. Similarly, FIG. 9 shows a PDC bit having modified cutters 904 disposed thereon. Referring to FIG. 9, the fixed-cutter bits (also called drag bits) 900 comprise a bit body 902 having a threaded connection at one end 903 and a cutting head 906 formed at the other end. The head 906 of the fixed-cutter bit 900 comprises a plurality of blades 908 arranged about the rotational axis of the bit and extending radially outward from the bit body 902. Modified cutting elements 904 are embedded in the blades 908 to cut through earth formation as the bit is rotated on the earth formation. As discussed above, the modified cutting elements may be mixed with standard cutting elements 905.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A cutter for a fixed cutter drill bit for cutting earth formations, the cutter comprising:

a substrate for mounting on said bit, said substrate having a periphery, an end surface, a longitudinal axis extending through said end surface; and an ultra hard material disposed on the end surface, said ultra hard material layer comprising an exposed upper surface opposite said end surface and a peripheral surface, wherein said ultra hard material upper surface intersects said ultra hard material peripheral surface along a peripheral edge wherein said peripheral edge continuously decreases and increases in height as measured from a first plane perpendicular to said longitudinal axis, wherein a second plane along said longitudinal axis intersects said peripheral edge at a first point and a second point and wherein a third plane along said longitudinal axis and perpendicular to said second plane intersects said peripheral edge at a third point and a fourth point, wherein said peripheral edge has a first convex portion extending from said first point in a direction toward said third point and a first concave portion from said first convex portion to said third point, wherein said peripheral edge has a second concave portion extending from said third point in a direction toward said second point and a second convex portion extending from said second concave portion to said second point, wherein said peripheral edge has a third convex portion extending from said second point in a direction toward said fourth point and a third concave portion extending from said third convex portion to said fourth point, and wherein said peripheral edge has a fourth concave portion extending from said fourth point in a direction toward said first point and a fourth convex portion extending from said fourth concave portion to said first point, wherein the first concave portion and the second concave portion define a first continuous concave curve, wherein the second convex portion and the third convex portion define a first continuous convex curve, wherein the third concave portion and the fourth concave portion define a second continuous concave curve and wherein the fourth convex portion and the first convex portion define a second continuous convex curve.

2. The cutter as recited in claim 1 wherein said first and second points are at a same height as measured from said first plane and wherein said third and fourth points are at a same height as measured from said first plane.

3. The cutter as recited in claim 2 wherein said first and second points are at maximum height of said peripheral edge as measured from said first plane and wherein said third and fourth points are at minimum height of said peripheral edge as measured from said first plane.

4. A fixed cutter drill bit comprising a body having the cutter as recited in claim 3 mounted thereon.

5. A fixed cutter drill bit comprising a body having the cutter as recited in claim 1 mounted thereon.

*6. A cutter for a fixed cutter drill bit, the cutter comprising:*

*a base portion for mounting on said fixed cutter drill bit; and*

*an ultrahard layer disposed on the base portion, the ultrahard layer comprising an exposed side surface and an exposed top surface surrounded by a peripheral edge formed at the intersection of the exposed side surface and exposed top surface, the exposed top surface comprising:*

*a cutting face extending a height above the base portion along a portion of the peripheral edge to form a first cutting edge portion along the peripheral edge; and*

*an apex extending from the first cutting edge to another portion of the peripheral edge,*

*the exposed top surface, adjacent the first cutting edge and the apex and extending from opposite sides of the apex, decreases in height in opposite directions away from the cutting face to other portions of the peripheral edge which have a lower overall height than the height of the cutting face and the first cutting edge portion such that at least a portion of the exposed top surface extending away from the apex has a convex curvature and such that the exposed side surface at the cutting edge has a greater height than the exposed side surface adjacent the other portions of the periph-*

*eral edge having the lower overall height, wherein said cutting face comprises at least a portion of the apex.*

*7. The cutter of claim 6, wherein the cutting face comprises a beveled edge around at least a portion of the periphery of the cutter.*

*8. The cutter of claim 7, wherein the cutting face comprises a beveled edge which extends less than a full periphery of the cutter.*

*9. The cutter of claim 7, wherein the beveled edge ranges from about 0.005 inches to about 0.050 inches.*

*10. The cutter of claim 6, wherein the at least one cutting face comprises a first cutting face and a second cutting face, wherein each extends to a height above the base portion along a portion of the peripheral edge to form the first cutting edge and a second cutting edge, respectively, and wherein the apex extends between the first and second cutting edges.*

*11. The cutter of claim 6, wherein the apex comprises a flat region extending from the first cutting edge to the other portion of the peripheral edge.*

*12. The cutter of claim 6, wherein a portion of the exposed top surface extending away from the apex has a concave curvature.*

*13. The cutter of claim 6, wherein the apex comprises a convex curvature.*

*14. A fixed cutter drill bit comprising a body having the cutter as recited in claim 6 mounted thereon.*

*15. A cutter for a fixed cutter drill bit, the cutter comprising:*

*a base portion for mounting on the fixed cutter drill bit; and*

*an ultrahard layer disposed on the base portion comprising an exposed top surface surrounded by a peripheral edge, the exposed top surface comprising:*

*a cutting face extending a height above the base portion along a portion of the peripheral edge to form a first cutting edge portion along the peripheral edge; and*

*an apex extending from the first cutting edge to another portion of the peripheral edge, where the exposed top surface, adjacent the first cutting edge and the apex and extending from opposite sides of the apex, decreases in height in opposite directions away from the cutting face and the first cutting edge portion to other portions of the peripheral edge which have a lower overall height than the height of the cutting face, wherein the cutting face comprises at least a portion of the apex;*

*wherein the peripheral edge has a beveled edge around at least a portion of the periphery of the exposed top surface, the beveled edge creating a varied edge geometry around at least a portion of the periphery of the exposed top surface.*

*16. The cutter of claim 15, wherein the varied edge geometry comprises a varied bevel width.*

*17. The cutter of claim 16, wherein the varied bevel width increases along a portion of the edge extending in either direction away from the first cutting edge.*

*18. The cutter of claim 16, wherein the varied bevel width decreases along a portion of the edge extending in either direction away from the first cutting edge.*

*19. The cutter of claim 15, wherein the varied edge geometry comprises a varied bevel angle.*

*20. The cutter of claim 15, wherein the apex comprises a flat region extending from the first cutting edge to the other portion of the peripheral edge.*

*21. The cutter of claim 15, wherein the apex comprises a convex curvature.*

*22. A fixed cutter drill bit comprising a body having the cutter as recited in claim 15 mounted thereon.*

*23. The cutter of claim 15, wherein the peripheral edge has the varied edge geometry adjacent the apex.*

*24. A fixed cutter drill bit, comprising:*

*a bit body having a bit axis and a direction of rotation about the bit axis;*

*at least one blade extending from the bit body, the at least one blade having a leading face facing the direction of rotation of the bit body about the bit axis, a trailing face facing away from the direction of rotation of the bit body about the bit axis, and a formation facing surface extending between the leading face and the trailing face, the at least one blade having at least one cutter pocket formed therein, the at least one cutter pocket opening to the leading face of the at least one blade; and*

*at least one cutting element attached to the at least one cutter pocket, the at least one cutting element comprising:*

*a base portion; and*

*an ultrahard layer on the base portion comprising an exposed top surface surrounded by a peripheral edge, the exposed top surface extending a height above the base portion along a portion of the peripheral edge to form a first cutting edge portion along the peripheral edge and the exposed top surface decreasing in height in a direction away from the height of the first cutting edge towards the base portion to another portion of the peripheral edge that has a lower overall height than the height of the cutting edge.*

*25. The fixed cutter drill bit of claim 24, wherein the peripheral edge has a varied geometry around at least a portion of the periphery of the exposed top surface.*

*26. The fixed cutter drill bit of claim 25, wherein the varied geometry comprises a varied bevel width.*

*27. The fixed cutter drill bit of claim 26, wherein the varied bevel width increases along a portion of the edge extending in either direction away from the first cutting edge.*

*28. The fixed cutter drill bit of claim 25, wherein the varied geometry comprises a beveled edge which extends less than a full periphery of the cutter.*

*29. The fixed cutter drill bit of claim 24, wherein the exposed surface further comprises an apex extending from the first cutting edge to another portion of the peripheral edge, and wherein the exposed surface decreases in height away from the apex.*

*30. The fixed cutter drill bit of claim 29, wherein the apex comprises a flat region extending from the first cutting edge to the other portion of the peripheral edge.*

*31. The fixed cutter drill bit of claim 29, wherein the apex comprises a convex curvature.*

*32. The fixed cutter drill bit of claim 29, wherein the peripheral edge has a varied geometry adjacent the apex.*

*33. The fixed cutter drill bit of claim 29, further comprising a plurality of cutting elements that form a cutter profile, wherein the at least one cutting element is oriented in the at least one cutter pocket such that the apex is aligned to be substantially perpendicular to the cutter profile.*

*34. A fixed cutter drill bit, comprising:*

*a bit body having a bit axis and a direction of rotation about the bit axis;*

*at least one blade extending from the bit body, the at least one blade having a leading face facing the direction of rotation of the bit body about the bit axis, a trailing face facing away from the direction of rotation of the bit body about the bit axis, and a formation facing surface extending between the leading face and the trailing face,*

*the at least one blade having at least one cutter pocket formed therein, the at least one cutter pocket opening to the leading face of the at least one blade; and*

*at least one cutting element attached to the at least one cutter pocket, the at least one cutting element comprising:*

*a base portion; and*

*an ultrahard layer on the base portion comprising an exposed top surface surrounded by a peripheral edge, the exposed top surface extending a height above the base portion to an apex that extends from a first region of the peripheral edge forming first cutting edge portion along the peripheral edge to another region of the peripheral edge and peripheral edge being a continuously curved edge that decreases in height in a direction away from the height of the first cutting edge.*

*35. The fixed cutter drill bit of claim 34, further comprising a plurality of cutting elements that form a cutter profile, wherein the at least one cutting element is oriented in the at least one cutter pocket such that the apex is aligned to be substantially perpendicular to the cutter profile.*

*36. The fixed cutter drill bit of claim 34, wherein the apex comprises a convex curvature.*

*37. A fixed cutter drill bit, comprising:*

*a bit body having a bit axis and a direction of rotation about the bit axis;*

*at least one blade extending from the bit body, the at least one blade having a leading face facing the direction of rotation of the bit body about the bit axis, a trailing face facing away from the direction of rotation of the bit body about the bit axis, and a formation facing surface extending between the leading face and the trailing face, the at least one blade having at least one cutter pocket formed therein, the at least one cutter pocket opening to the leading face of the at least one blade; and*

*a plurality of cutting elements forming a cutting profile, at least one of the plurality of cutting elements being attached to the at least one cutter pocket and comprising:*

*a base portion; and*

*an ultrahard layer on the base portion comprising an exposed top surface surrounded by a peripheral edge, the exposed top surface extending a height above the base portion to an apex that extends from a first region of the peripheral edge forming first cutting edge portion along the peripheral edge to another region of the peripheral edge and the exposed top surface decreasing in height in a direction away from the height of the apex and first cutting edge towards the base portion to another portion of the peripheral edge that has a lower overall height than the height of the cutting edge,*

*wherein the at least one of the plurality of cutting element is oriented in the at least one cutter pocket such that the apex is aligned to be substantially perpendicular to the cutter profile.*

*38. The fixed cutter drill bit of claim 37, wherein the apex comprises a flat region extending from the first cutting edge to the other portion of the peripheral edge.*

*39. The fixed cutter drill bit of claim 37, wherein the apex comprises a convex curvature.*

* * * * *